Apr. 17, 1923.
C. GLAHOLT
1,451,693
DIRIGIBLE HEADLIGHT
Filed Feb. 14, 1922    2 sheets-sheet 1
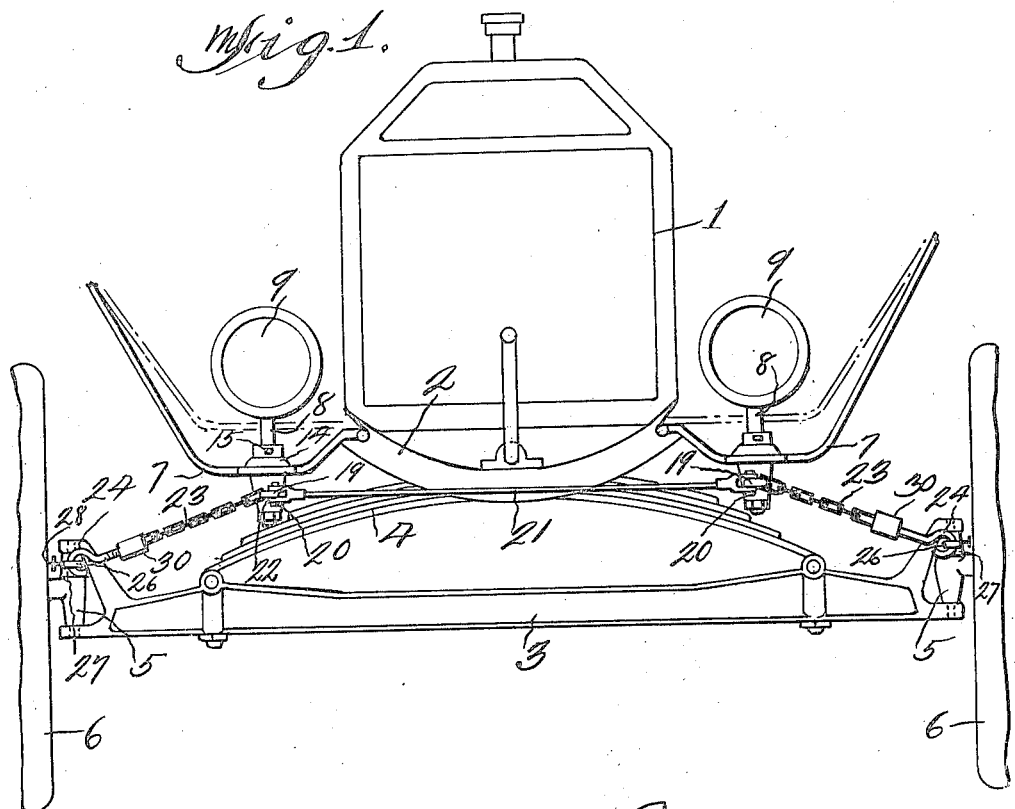
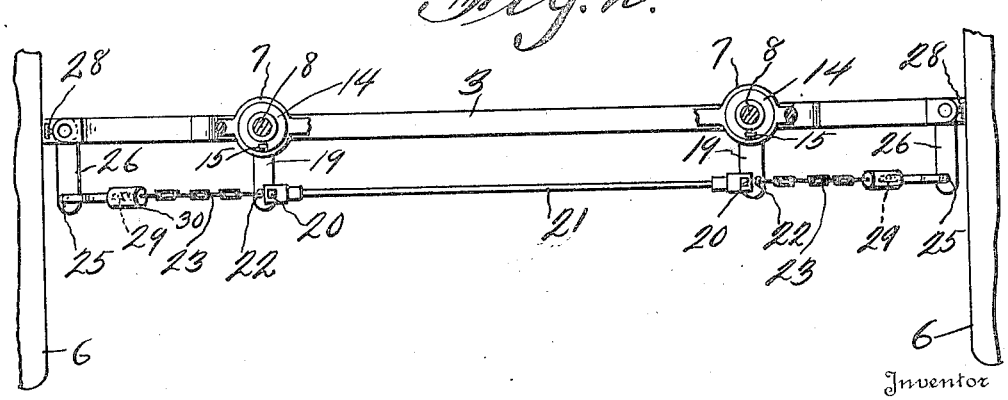
Inventor
C. Glaholt
By D. Swift
Attorney

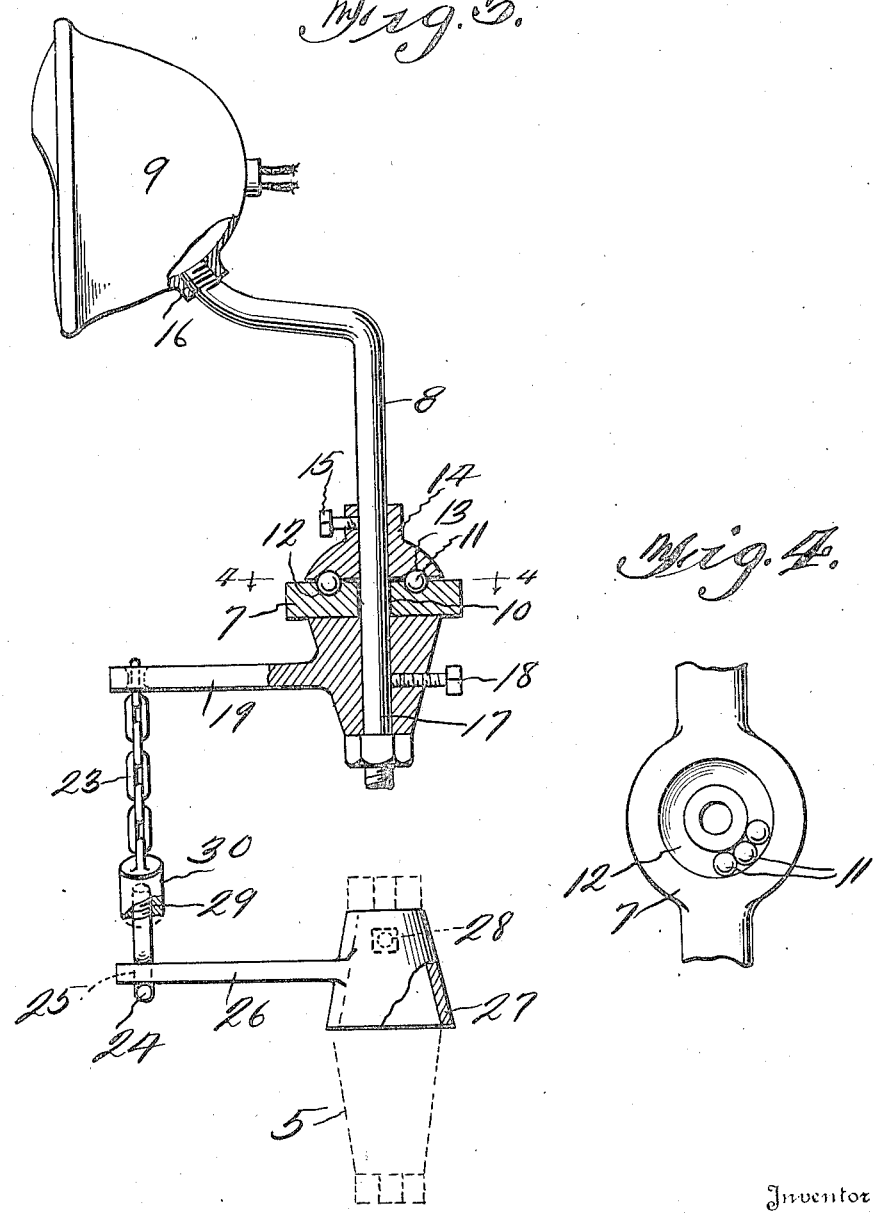

Patented Apr. 17, 1923.

1,451,693

UNITED STATES PATENT OFFICE.

CARL GLAHOLT, OF UNION, NORTH DAKOTA.

DIRIGIBLE HEADLIGHT.

Application filed February 14, 1922. Serial No. 536,489.

*To all whom it may concern:*

Be it known that I, CARL GLAHOLT, a citizen of the United States, residing at Union, in the county of Cavalier, State of North Dakota, have invented a new and useful Dirigible Headlight; and I do hereby declare the following to be a full, clear, and exact description of the invention, such as will enable others skilled in the art to which it appertains to make and use the same.

The invention relates to dirigible headlights for motor driven vehicles, and has for its object to provide a device of this character comprising pivoted lights on each side of the vehicle, which lights are carried by vertically disposed standards pivotally mounted in bearings of brackets. The lower ends of said standards are provided with forwardly extending arms connected together by a connecting rod and connected to forwardly extending arms carried by the steering knuckles of the front axle structure. The connection between the arms of the posts and the arms of the steering knuckles being formed by downwardly and outwardly extending chains having members whereby the lengths of the chains may be adjusted.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawing:—

Figure 1 is a front elevation of a conventional form of automobile, showing the headlight mechanism applied thereto.

Figure 2 is a horizontal sectional view through the lamp posts and brackets, and showing the headlight controlling mechanism in top plan view.

Figure 3 is a vertical sectional view through the supporting means of one of the lamp posts, and showing in side elevation one of the members carried by the steering knuckles.

Figure 4 is top plan view of the ball bearing portion of one of the post supporting brackets.

Referring to the drawings, the numeral 1 designates a radiator of a conventional form of motor driven vehicle, and 2 the frame thereof. The frame 2 is supported spaced from the axle 3 by the transversely disposed spring 4. Pivotally mounted in the ends of the axle 3 are conventional forms of steering knuckles 5, which knuckles taper towards their upper and lower ends. Steering knuckles 5 having pivotally mounted thereon the front steering wheels 6 of the vehicle. All of the above structure is of conventional form.

Extending outwardly from the sides of the frame 2 are brackets 7, which brackets have pivotally mounted therein the vertical posts 8 of the lamps 9. The posts 8 extend through apertures 10 in the brackets 7, and are supported on ball bearings 11 which are mounted in the raceways 12 in the upper faces of the brackets 7. The ball bearings 11 engage in raceways 13 in the under faces of the collars 14 carried by the posts 8 and adjustable thereon by means of the set screws 15. It will be seen that the lamp posts 8 are anti-frictionally supported. The upper ends of the lamp posts 8 extend upwardly and forwardly and have secured thereto at 16 the lamps 9. Secured to the lower ends 17 of the posts 8 by means of set screws 18 are forwardly extending horizontally disposed arms 19, which arms have pivotally connected at 20 to their forward ends the connecting rod 21. Connecting rod 21 forms means whereby upon a rotation of either of the lamp posts 8, the lamp posts at the opposite side of the vehicle will be simultaneously rotated in the same direction, thereby moving the lamps 9 simultaneously to one side or the other of the vehicle. Connected to the forward ends of the arms 19 at 22 are downwardly and outwardly extending chains 23, which chains terminate in adjustable hooks 24, which hook through apertures 25 in the forward ends of arms 26 mounted on the steering knuckles 5. The arms 26 are carried by conically shaped sleeves 27, which sleeves receive the upper tapered ends of the steering knuckles and are held thereon in any adjusted position in a horizontal plane by means of the set screws 28. It will be seen that by adjusting the sleeves 27 that the arms 26 can be adjusted in parallel relation to each other, and that by adjusting the hooks in their threaded engagement at 29 with the members 30 carried by the chains 23 that the slack within the chains can be easily regulated.

From the above it will be seen that a dirigible headlight mechanism is provided which mechanism is simple in construction, positive in its operation and may be easily adjusted and applied to vehicles. Also that the lights 9 will be moved in the direction of movement of the steering wheels 6 of the vehicle thereby projecting the rays of light on the roadway in advance of the vehicle when the same is going straight ahead or making a turn.

The invention having been set forth what is claimed as new and useful is:—

A dirigible headlight mechanism for automobiles, said mechanism comprising vertically disposed pivoted headlight standards mounted in bearings, forwardly extending arms carried by said standards, a connecting rod connecting said arms together, forwardly extending arms carried by the steering knuckles of the vehicle, transversely disposed downwardly and outwardly extending chains carried by the arms of the standards, hooks carried by the outer ends of the chains and attached to the outer ends of the arms carried by the steering knuckles and adjusting means carried by said chains whereby the same may be lengthened or shortened.

In testimony whereof I have signed my name to this specification in the presence of two subscribing witnesses.

CARL GLAHOLT.

Witnesses:
 TOMMY KRAVIK,
 M. O. FLORENCE.